United States Patent [19]

Iwasaki et al.

[11] Patent Number: 4,773,002
[45] Date of Patent: Sep. 20, 1988

[54] MICROPROGRAM CONTROLLER IN WHICH INSTRUCTION FOLLOWING CONDITIONAL BRANCH INSTRUCTION IS SELECTIVELY CONVERTED TO A NOP INSTRUCTION

[75] Inventors: Kazuhiko Iwasaki, Hachioji; Noboru Yamaguchi, Higashiyamato; Tsuneo Funabashi, Tokyo; Junichi Tatezaki, Kodaira; Takanori Shimura, Kokubunji, all of Japan

[73] Assignee: Hitachi, Ltd., Tokyo, Japan

[21] Appl. No.: 865,388

[22] Filed: May 21, 1986

[30] Foreign Application Priority Data

May 23, 1985 [JP] Japan .................... 60-111238

[51] Int. Cl.[4] .................... G06F 9/32; G06F 9/38
[52] U.S. Cl. .................... 364/200
[58] Field of Search ... 364/200 MS File, 900 MS File

[56] References Cited

U.S. PATENT DOCUMENTS

| | | | |
|---|---|---|---|
| 4,095,278 | 6/1978 | Kihara | 364/900 |
| 4,179,731 | 12/1979 | Yamazaki | 364/200 |
| 4,398,247 | 8/1983 | Bazlen et al. | 364/200 |
| 4,415,969 | 11/1983 | Bagliss et al. | 364/200 |
| 4,514,804 | 4/1985 | Kimoto | 364/200 |

*Primary Examiner*—Archie E. Williams, Jr.
*Assistant Examiner*—Mary Rutkowski
*Attorney, Agent, or Firm*—Antonelli, Terry & Wands

[57] ABSTRACT

In a microprogram controller by pipeline control which includes a memory for storing a microprogram and a program counter for representing the address of the memory, a microprogram controller includes means for judging whether or not a branch condition of a branch microinstruction is satisfied and means for converting the microinstruction fetched from the memory to a NOP (No Operation) microinstruction from the output of the next step of the memory till the outputs after a plurality of steps by the affirmation output of the judging means. When the affirmation output is obtained from the judging means, part of the memory output is loaded into the program counter and when the negation output is obtained, a value as the sum of a current value plus 1 is loaded into the program counter.

4 Claims, 5 Drawing Sheets

| ADR | MICROINSTRUCTIONS | |
|-----|------|------|
| 100 | MOVE | X, A |
| 101 | ADD | 1, D |
| 102 | JUMP | 106 |
| 103 | ADD | A, B |
| 104 | SUB | C, B |
| 105 | SHIFT | RIGHT 1 |
| 106 | MOVE | A, Z |
| 107 | MOVE | X, E |
| 108 | ADD | 1, H |
| 109 | JUMP | 112 |
| 110 | ADD | E, F |
| 111 | SUB | G, F |
| 112 | MOVE | A, Z |

| ADR | N. JUMP | | D. JUMP | | O, D. JUMP | |
|---|---|---|---|---|---|---|
| n−1 | MOVE | X, A | MOVE | X, A | MOVE | X, A |
| n | ADD | 1, D | ADD | 1, A | JUMP | n+4 |
| n+1 | JUMP | n+4 | JUMP | n+5 | ADD | 1, A |
| n+2 | ADD | A, B | NOP | | ADD | A, B |
| n+3 | SUB | C, B | ADD | A, B | SUB | C, B |
| n+4 | MOVE | A, Z | SUB | C, B | MOVE | A, Z |
| n+5 | | | MOVE | A, Z | | |

MICROPROGRAM CONTROLLER IN WHICH INSTRUCTION FOLLOWING CONDITIONAL BRANCH INSTRUCTION IS SELECTIVELY CONVERTED TO A NOP INSTRUCTION

BACKGROUND OF THE INVENTION

This invention relates generally to a microprogram control system, and more particularly to a processor of microprogram control for pipeline processing including a branch microinstruction.

Microprogram control systems have been used as a control system of microprocessors. In the microprogram control system, an operation code inputted from outside is decoded by an instruction decoder, the result is transferred to a memory storing therein a microinstruction, and a microinstruction sequence is acutated. Among the microprogram control systems, a system which stores the microinstruction in a ROM (Read Only Memory) inside a chip is known. A system in which the content of the address defined by a microprogram counter is fetched from ROM, decoded and executed is known. In such a case, the basic form in which fetch, decode and execution of the microinstruction and fetch of a next microinstruction are carried out in the order named is referred to as "sequential control". In contrast, a form in which a microinstruction to be executed in future is anticipated in parallel with the execution of a current instruction and the microinstruction to be executed in the future is prefetched is referred to as "advance control".

A form in which a plurality of programs are parallel processed at the same point of time is referred to as "multi-processing".

A processing method which subjects a plurality of instructions to simultaneous advance control and to parallel processing or in other words, which simultaneously effects advance control and multi-control in exactly the same way as in a belt conveyor system, is referred to as "pipeline control". In the pipeline control system, the operation of a microinstruction is divided into several stages and in the meantime, a large number of data sets are simultaneously passed so as to increase processing performance per unit time.

In processors providing pipeline control, branch control has been the problem in the past. In other words, since a plurality of cycles is necessary for the operation of one microinstruction, a speed of one instruction/one cycle has been obtained by effecting advance control and parallel processing of the microinstruction by pipeline control. However, if a branch microinstruction exists midway in the sequence, the sequence of operation of the microinstruction is disturbed. In other words, the microinstruction that has already been fetched or decoded becomes invalid, and the fetching of a target microinstruction defined by the branch instruction becomes necessary once again, and a drastic delay of the operation speed occurs.

With the improvement in the integration density of semiconductors, microprocessors using microprogram control have gained a preferred status. In such microprocessors, a microprogram control system of two-level pipeline control having lower multiplicity has often been used. In the two-level pipeline control, in each clock cycle during which a program counter represents each address of n, n+1, n+2, n+3, . . . (that is to say, when the microinstruction at each address of n, n+1, n+2, n+3, . . . is fetched), the microinstruction stored in each succeeding address, i.e., n−1, n, n+1, n+2, . . . , is being executed. Two-phase clocks $\phi_1$ and $\phi_2$ that do not overlap with each other are used as the operation clocks. In the pipeline control, parallel processing and advance control are effected simultaneously. For example, when the program counter represents n at the clock $\phi_1$, the microinstruction n−1 is executed and at the same time, the microinstruction n is prefetched.

In this case, too, however, control of branch microinstructions such as jump (JMP), jump to subroutine (JSR) or return from subroutine (RTS) becomes a problem. In other words, since pipeline control is effected, the microinstruction of the next address to the branch microinstruction is executed.

It will be hereby assumed that the microinstruction at the (n+1)th address is the following branch microinstruction in the control sequence shown in FIG. 5:

JMP cc ADR (1)

Here, JMP is a branch instruction code, cc is a branch condition code and ADR is a target address of branch. When the branch condition is satisfied, the target address of branch ADR is loaded to the program counter and at the same time, the instruction of the (n+2)th address is executed as shown in FIG. 5. Since the instruction of the (n+2)th address is one that continues the branch instruction, it should not be executed originally, but is executed in practice. In other words, there is the problem that the microinstruction of the address next to the branch microinstruction is executed.

As means for solving this problem, Patterson et al. proposed "Delayed Jump System" (D. A. Patterson and C. H. Sequin, "A VLSI RICS", IEEE COMPUTER, Vol. 15, No. 9, pp. 8–21, Sept. 1982).

According to this delayed jump system, a NOP (No Operation) microinstruction is inserted immediately after the branch microinstruction. In other words, as illustrated in the comparison table of conditional branch instructions of FIG. 6, the two-level pipeline control is made in the sequence of MOVE X, A (move instruction) at the (n−1)th address, ADD 1, A (addition instruction) at the nth address, JUMP n+4 (branch instruction: jump to the (n+4)th address) at the (n+1)th address and ADD A, B (addition instruction) at the (n+2)th address in normal branch (normal jump: N. JUMP). At this time, the instruction ADD A, B, which is next to the instruction JUMP n+4, is also executed. In other words, if the branch condition is true, MOVE A, Z which is the instruction of the (n+4)th address should be executed after the instruction of JUMP n+4. However, the instruction ADD A, B is executed, too, in the sequence before the jump. In contrast, in the delayed jump (D. JUMP) system, the NOP instruction is always inserted after JUMP n+5 (branch instruction) of the (n+1)th address when the program is prepared. For this reason, the NOP instruction next to JUMP n+5 is executed in the case of the pipeline control. In this case, each microprogram is moved back by one address. This means that the program size becomes greater by the NOP instruction, and is not suitable from the aspect of integration density in microprocessors of one-chip type which store the microinstructions in ROM or the like.

Furthermore, in an optimized delayed jump (O. D. JUMP) system which effects optimization, the sequence of the branch microinstruction (JUMP n+4) and the instruction (ADD 1, A) immediately after the former is replaced and the NOP microinstruction is deleted. Accordingly, the microinstruction (add instruction of ADD 1, A) whose sequence is thus changed can be executed, too, by the two-level pipeline control without increasing the program size.

However, the optimized delayed jump system cannot always be used. For example, optimization cannot be made for conditional branch microinstructions in which branching is effected according to the result of calculation of the microinstruction just before, and so a NOP microinstruction just after is necessary, too. In the optimized delayed jump (O. D. JUMP) shown in FIG. 6, for example, whether or not a branch is made is determined depending upon the result of ADD 1, A (add instruction) immediately after the instruction JUMP n+4. In this case, the sequence of the branch instruction JUMP n+4 and the add instruction ADD 1, A cannot be changed, and the NOP instruction must be inserted next to the instruction JUMP n+4.

Therefore, if the branch instruction controlled by the delayed jump system is employed, a large number of NOP microinstructions are necessary for the microprogram of those microprocessors in which a large number of conditional branch microinstructions appear such as microprocessors for controlling I/O controllers, for example, so that the number of steps of the microprogram becomes greater by the number of inserted NOP instructions, the memory capacity increases and the integration density of the microprocessors drops.

SUMMARY OF THE INVENTION

In order to eliminate the problems with the prior art systems described above, the present invention is directed to provide a microprogram controlling system which eliminates the necessity of inserting NOP microinstructions into a microprogram itself for the microprogram of a microprocessor of pipeline control in which a large number of conditional branch microinstructions appear, and thus makes it possible to increase the integration density of the microprocessor.

In a microprogram controller by pipeline control which includes a memory for storing a microprogram and a program counter for representing the address of the memory, the object of the invention described above can be accomplished by a microprogram controller which is characterized by including means for judging whether or not the branch condition of a branch microinstruction is satisfied, and means for converting the microinstruction fetched from the memory to a NOP (No Operation) microinstruction from the output of the next step of the memory till the outputs after a plurality steps by the affirmation output of the judging means. In other words, when the affirmation output is obtained from the judging means, part of the memory output is loaded into the program counter and when the negation output is obtained, the value as the sum of the current value plus 1 is loaded into the program counter.

BRIEF DESCRIPTION OF THE DRAWINGS

FIGS. 2(a) to 2(c) are format diagrams of microinstructions used in the present invention;

FIG. 3 is a table showing the operation sequence of the microinstructions;

DESCRIPTION OF THE PREFERRED EMBODIMENT

Hereinafter, the present invention will be described in further detail with reference to a preferred embodiment thereof.

Figures 2A, 2B, 2C:
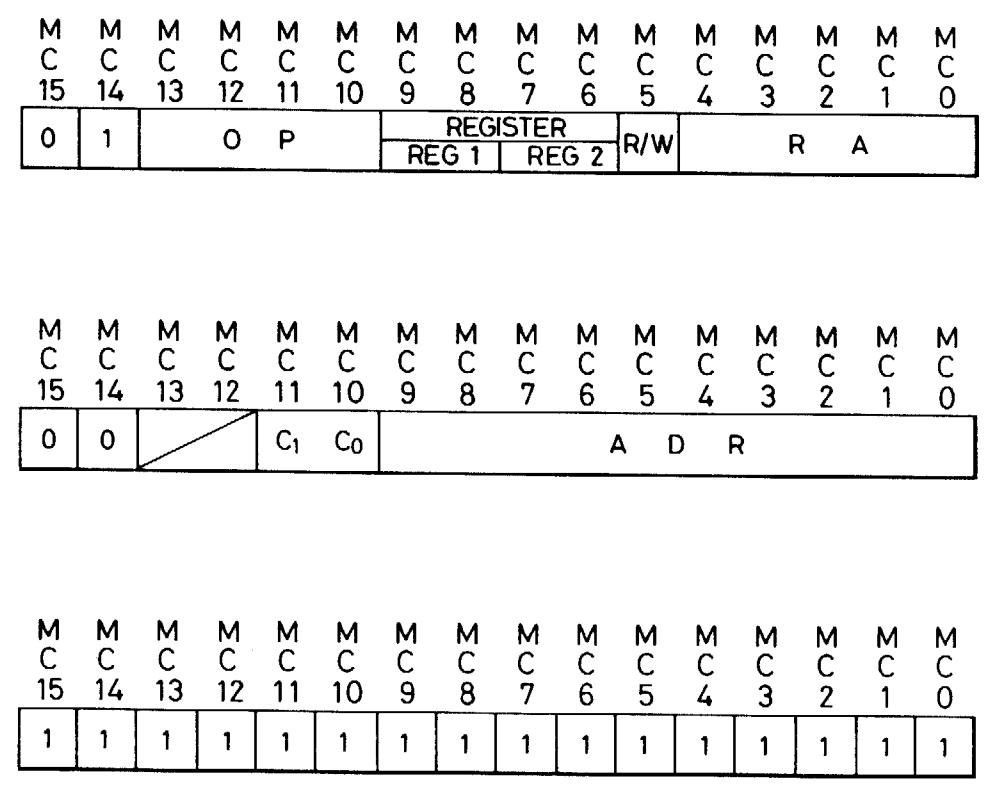

FIG. 2(a) shows a format of a general microinstruction and its length is 16 bits. Each bit is named MC0~MC15. In Read/Write microinstruction (R/$\overline{W}$), for example, the bits are determined as MC15=0, MC14=1, operation code (OP), registers (REG1, REG2), Read/Write (R/W) and RAM address (RA).

FIG. 2(b) shows a format of a branch microinstruction. In the branch microinstruction, MC15="0", MC14="0" and this represents that the microinstruction is the branch microinstruction. MC13 and MC12 are unused bits (undefined bits) and MC11 and MC10 represent condition codes. Furthermore, 10 bits from MC9 to MC0 represent the target address of branch (ADR). The target address of branch can represent the addresses from the 0 address to a (2 -1)th address. FIG. 2(c) shows an NOP microinstruction, and all the bits are "1" in this case.

Figure 1:
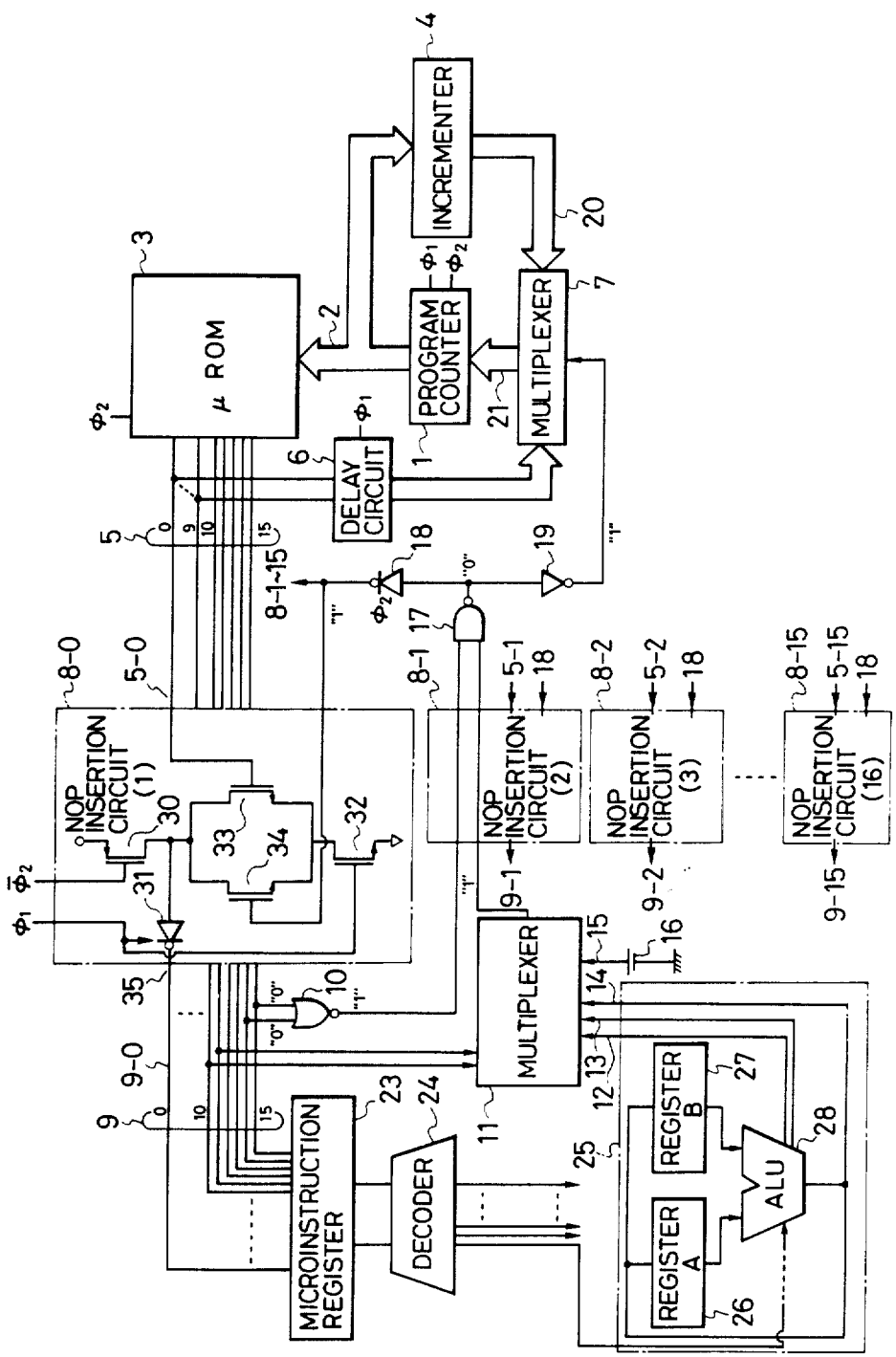
FIG. 1 is a block diagram of a microprogram control portion and an arithmetic and logic unit portion in accordance with one embodiment of the present invention.

FIG. 1 is a block diagram of a microprogram control portion in accordance with one embodiment of the present invention.

In FIG. 1, reference numeral 1 represents a program counter, and 2 indicates an output bus of the program counter, which has a 10-bit bus width and is connected to a microprogram ROM ($\mu$ROM) 3 and to an incrementer 4. Symbols $\phi_1$ and $\phi_2$ represent two-phase clocks that do not overlap with each other and are inputted to the program counter 1, the microprogram ROM3, an NOP insertion circuit 8, a clocked gate 18 and a delay circuit 6, respectively. The microprogram ROM ($\mu$ROM) 3 is an ROM whose access time is one clock cycle of $\phi_1$, $\phi_2$, and which stores therein the microinstruction. The content of the ROM at the address represented by the program counter 1 is outputted to the bus 5 in synchronism with the clock $\phi_2$. Among the outputs of the $\mu$ROM3, the lower order 10 bits are inputted to a multiplexer 7 through the delay circuit 6.

The construction described so far is the same as that of the prior art apparatus. However, this embodiment provides additional NOP insertion circuits 8-0~8-15, a NOR gate 10, a NAND gate 17, a multiplexer 11, a clocked gate 18 and an inverter 19. The bus 5 is a 16-bit wide bus, and each bit of the microinstruction format is outputted to a bus 9 through 16 NOP insertion circuits 8-0~8-15. The bus 9, too, is a microinstruction bus and is a 16-bit wide bus. Each of the NOP insertion circuits 8-0~8-15 is a circuit that calculates the logical sum of the output of the clocked gate 18, that is, the output of the NOP Insertion circuit, and the output of the bus 5 and outputs the result to the bus 9 in synchronism with the clock $\phi_1$ (with 31 representing a clocked gate). It is a circuit that converts the microinstruction immediately after the branch microinstruction to the NOP microinstruction. Each NOP insertion circuit 8-0~8-15 is inserted between the bus 5 and the bus 9 for each bit. (Since the buses 5 and 9 are 16-bit buses, sixteen NOP insertion circuits are provided.)

The output of the NOR gate 10 is shifted up to a high level only when both the 15th bit and 14th bit of the microinstruction are "0", that is, MC15="0" and MC14="0", or in other words, only in the case of the branch microinstruction shown in FIG. 2(b). The 11th bit of the microinstruction, i.e. MC11, the 10th bit of the microinstruction, i.e. MC10 from the bus 9 (which represent the branch condition of the branch microinstruction as shown in FIG. 2(b)), the output 12~14 from an arithmetic unit 25 and the output 15 of a battery (5 V) 16 are applied to the multiplexer 11. The multiplexer 11 outputs the carry signals and 0 signal from the arithmetic unit 25, the outputs 12~14 such as test result signals or the output 15 of the battery in accordance with the values of MC11 and MC10. In the case of a nonconditional branch microinstruction, for example, the output of the battery 16, that is, the high level output, is unconditionally applied to one of the input terminals of the NAND gate 17. This NAND gate 17 receives the output of the NOR gate 10 and the output of the multiplexer 11, and its output is at the low level only when the branch condition is satisfied in the branch microinstruction. The output of the NAND gate 17 is delivered to the NOR insertion circuits 8-0~8-15 through the clocked gate 18 and also to the multiplexer 7 through the inverter 19. If the high or low level signal is applied from the NAND gate 17 to the clocked gate 18 during the period in which no clock $\phi_2$ is applied thereto, the clocked gate is charged to the high or low level, but an inversion output is sent to the NOP insertion circuit 8 simultaneously with the input of the clock $\phi_2$.

The NOP insertion circuits 8-0~8-15 calculate the logical sum between each output of the sixteen outputs from µROM 3 and the output from the clocked gate 18 and outputs it to the bus 9 in synchronism with the clock $\phi_1$. Therefore, when the output of the NAND gate 17 is at the low level, that is, after one clock from the point of time when the branch condition is satisfied in the branch microinstruction, the outputs of all the NOP insertion circuits 8-0~8-15 shift to the high level, and the microinstruction bus 9 represents the NOP microinstruction (the format of MC0~MC15="1") shown in FIG. 2(c).

On the other hand, the output of the NAND gate 17 is inputted to the multiplexer 7 through the inverter 19.

The multiplexer 7 is an apparatus which controls the input of the program counter, and selects the output of the bus 5 through the delay circuit 6 when the output of the inverter 19 is at the high level and the output of the incrementer 4 through the bus 20 when the output of the inverter 19 is at the low level. In other words, when the branch condition is satisfied in the branch microinstruction, the multiplexer loads MC0~MC9 as the target address of a branch to the program counter 1 through the bus 21. The delay circuit 6 delivers the lower order 10 bits (MC0~MC9) of the branch microinstruction that have been sent from the µROM 3 through the bus 5 to the multiplexer 7 in synchronism with the next cycle of the clock $\phi_1$, and this value is loaded as the content of the program counter 1 in the next cycle.

When the branch condition is unsatisfied in the branch microinstruction and when the microinstruction is not the branch microinstruction, the value of the program counter 1 is incremented by one.

Figure 4:
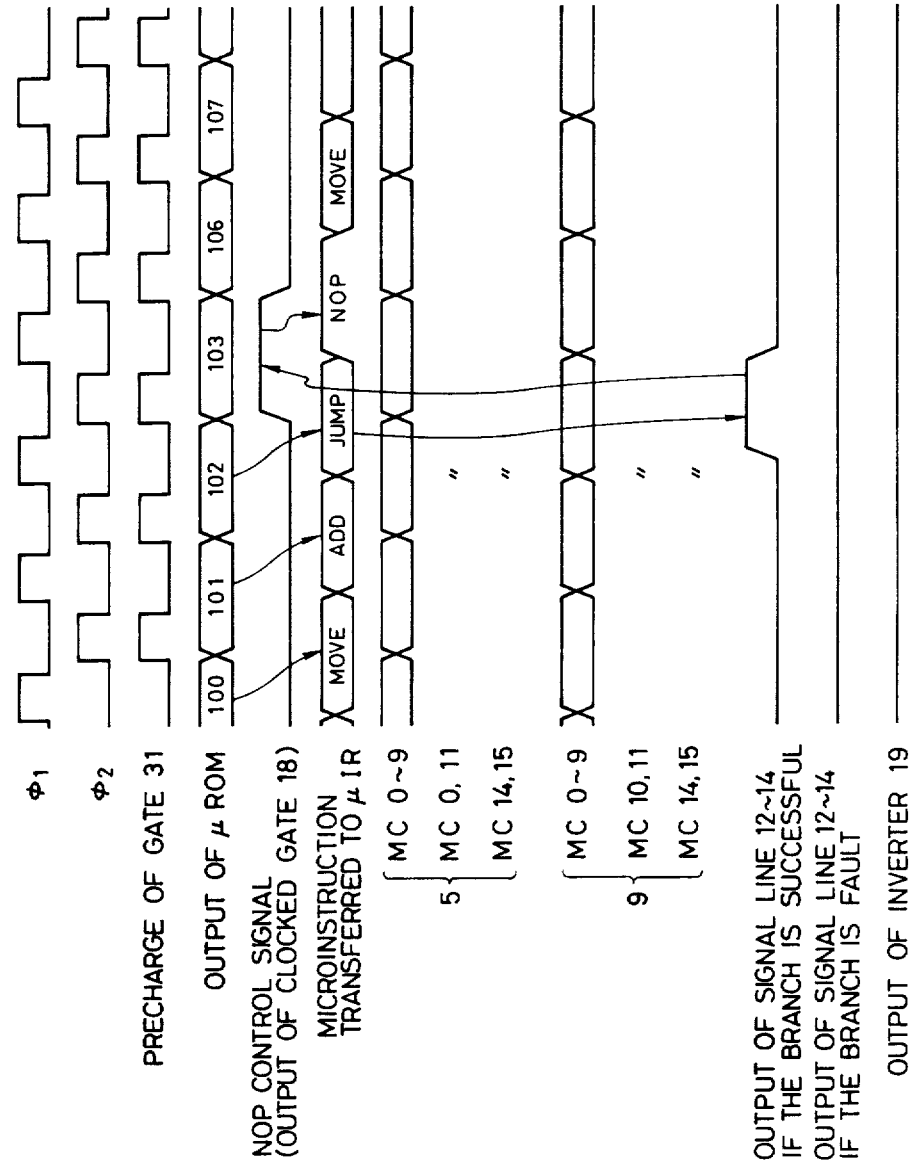
FIG. 4 is a timing chart showing the operation timing of FIG. 1.
Figures 5, 6:
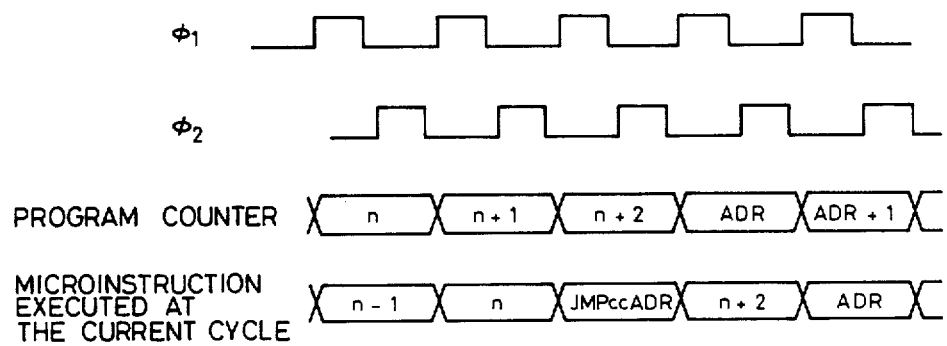
FIGS. 5 and 6 are an operation time chart of microprogram of conventional two-level pipeline control and a diagram showing the operation sequence of the microinstruction of a delayed jump system, respectively.

FIG. 3 is a table showing the operation sequence of instruction groups in the present invention and FIG. 4 shows an operation time chart of FIG. 1.

When the 101th address is set to the program counter 1, the preceding instruction, that is, the instruction "MOVE X, A" of the 100th address, is fetched from the µROM 3 and executed. When the 102th address as the incremented value is set to the program counter 1, the preceding instruction, that is, "ADD 1, D", is fetched from the µROM 3 and executed. At this time, among the 16-bit instruction delivered to the bus 5, MC0~MC15 represent the values for the respective fields allotted thereto as shown in FIG. 2(a). This add instruction is inputted to the respective NOP insertion circuits 8-0~8-15 through the sixteen lines of bus 5. As shown in FIG. 1, one NOP insertion circuit is disposed for each signal line. Though the circuit corresponding to the signal of MC0 is shown in detail in FIG. 1, the construction of the circuits corresponding to the signals of MC1~MC15 is also exactly the same.

The NOP insertion circuit 8-0 consists of a p-channel MOS transistor 30 receiving the clock $\phi_2$ at its gate, a clocked gate 31 receiving the clock $\phi_1$, an n-channel MOS transistor 34 receiving the hardware NOP from the clocked gate 18 at its gate, an n-channel MOS transistor 33 receiving MC0 of the microinstruction from the µROM 3 through the signal line 0 of the bus 5 and an n-channel MOS transistor 32 receiving the clock $\phi_1$ at its gate.

The p-channel MOS transistor 30 is turned on when the clock $\phi_2$ is at the high level (or when $\phi_2$ is at the low level), connects a (+) power source to the clocked gate 31 and pre-charges the gate to the high level (see FIG. 4). At this time, since the clock $\phi_1$ is at the low level, the n-channel MOS transistor 32 is turned off, and even when the high level signal is applied to the gates of the n-channel MOS transistors 33, 34 from the bus 5 and from the clocked gate 18, the transistors 33, 34 keep the OFF state.

When the clock $\phi_1$ is at the high level and when the input of at least one of the n-channel MOS transistors 33 and 34 is at the high level, the n-channel MOS transistors 33 or 34 and 32 are turned ON, so that the discharge path is formed for the charge that has been charged to the gate of the clocked gate 31 and discharge is effected. At this time, since the clocked gate 31 is an inverter, when one of the ends drops to the low level due to the discharge, the output 35 of the clocked gate 31 shifts to the high level. In this manner the microinstruction is outputted to the bus 9 shown in FIG. 1.

Next, even when the 103th address is set to the program counter 1, the branch instruction "JUMP 106" is fetched from the µROM 3. Therefore, the codes of the target address of branch as MC0~MC9 of the branch instruction are delivered to the bus 5. The branch condition codes as MC10 and MC11 are also sent. "0" levels are sent for both of MC14 and MC15. Therefore, the "0" signal, that is, the low level signal, is inputted to the NOP insertion circuits 8-14 and 8-15; hence, the transistors 33 of the circuits 8-14, 8-15 are OFF. Since the preceding instruction is not the branch instruction, the output of the clocked gate 18 is at the low level and hence the transistor 34 is also OFF. As a result, the charge that has been pre-charged to the clocked gate 31 is not discharged and the output microinstruction 35 (MC14, MC15) at the other end of the gate 31 drops to the low level. Therefore, the output of the OR gate 10 shifts to the high level. In addition, MC10, MC11 of the branch instruction on the bus 9 are the $C_0$, $C_1$ branch condition codes, and they are decoded by the decoder 24 after being set in the microinstruction register 23.

When the branch condition is satisfied as the control signal generated in the decoder controls the arithmetic unit 25, the high level carry signal 12 or the high level calculation result signal 14 is inputted to the multiplexer 11, and this input is as such outputted by the application of the condition signal of MC10, MC11 and are applied to the AND gate 17.

When the branch condition is unsatisfied, the low level carry signal 12, the "0" signal 13 or the low level calculation result signal 14 is inputted to the multiplexer 11 so that the low level is applied to the AND gate. When both inputs of the AND gate are at the high level, the output of the clocked gate 18 is also at the high level and is applied to the gate of each transistor 34 of the sixteen NOP insertion circuits 8-0~8-15. In other words, the hardware NOP is asserted. Incidentally, in the case of the unconditional branch instruction, the output of the battery 16 is inputted to the multiplexer in accordance with the result of decoding MC10, 11.

When the hardware NOP is asserted from the clocked gate 18, the transistors 32 and 34 are ON and form the discharge path of the clocked gate 31, so that the microinstruction 35 shifts unconditionally to the high level as represented by an arrow in FIG. 4. In other words, all the bits of MC0~MC15 of the microinstruction 35 on the bus 9 in FIG. 9 are at the high level and are outputted as the NOP instruction shown in FIG. 2(c). In this manner, even when the $\mu$ROM 3 does not store therein the NOP instruction, the NOP instruction is inserted in the NOP insertion circuit 8 next to the branch instruction, so that the instruction of the 103rd address that has been set to the program counter 1 is not executed.

On the other hand, when the branch condition is not satisfied, the transistor 34 is OFF and the transistor 33 is ON and OFF in accordance with the output of the $\mu$ROM 3, that is, depending upon whether each bit of the microinstruction is at the high or low level, and the charge that has been pre-charged to the clocked gate 31 is either discharged or is kept charged. Therefore, the microinstruction 35 at the other end of the gate 31 is either at the high or low level. In other words, the microinstruction at the 103rd address is outputted to the bus 9. This microinstruction is stored in the microinstruction register 23, is decoded by the decoder 24 and is executed by controlling the arithmetic unit 25.

Incidentally, when the condition is not satisfied, the signal lines 12~14 keep the low level as shown in FIG. 4 and the output of the AND gate 17 is at the high level. For this reason, the output of the inverter 19 is at the low level and the low level is inputted to the multiplexer 7. A signal incremented by the incrementer 4 is selected as the next address and is set to the program counter 1.

By the use of the hardware construction consisting of the NOP insertion circuits 8-0~8-15, the clocked gate 18 and the like as described above, when the branch condition is satisfied in the branch microinstruction, the microinstruction of the next clock cycle is converted to the NOP microinstruction by the hardware. Therefore, when the branch condition is satisfied in the branch microinstruction, the next micro-instruction is not executed; hence, the NOP microinstruction need not be inserted into the $\mu$ROM 3.

Incidentally, though the NOP instruction is supposed to be all "1" in the embodiment described above, the embodiment can be practiced similarly by supposing the NOP instruction as all "0" or any other specific pattern.

Therefore, in addition to the output of the result of calculation of the logical sum between the output of the branch judging circuit and each bit of the output of the $\mu$ROM 3 as the microinstruction, the result of logical calculation such as logical product can also be outputted.

Assuming that the proportion of the branch microinstruction is 30% in the microprogram, an additional NOP microinstruction corresponding to this 30% is necessary in the delayed jump system which does not effect optimization among the conventional systems. In the delayed jump system which effects optimization, conditional/nonconditional branch microinstructions appear at a rate of 50%, respectively. If the optimizable ratios are supposed to be 0% and 60%, respectively, additional NOP microinstructions are necessary in the number represented by the following formula:

$$30\% \times [0.5 \times (1.0-0.0)\ 0.5 \times (1.0-0.6)] = 21\% \quad (2)$$

In contrast, the embodiment of the present invention does not at all need the insertion of the NOP microinstruction.

In the so-called "pipeline control" using conjointly the advance control and the multi-control, the pipeline operation at two or more levels is effected, and this embodiment explains the processing of the microprocessor by the two-level pipeline control.

Generally, microprogram processing is carried out in the sequence of (a) fetch of instruction, (b) decode of instruction, (c) calculation, data transfer, and so forth. In the pipeline control, the steps (a), (b) and (c) are first conducted in parallel with each other by the advance control in order to efficiently utilize the hardware and to improve the processing speed. Furthermore, two-level control, that is, fetch of a next microinstruction while the calculation data of one preceding microinstruction is being transferred, is effected by multi-control. In other words, if the steps (a)-(c) are the processing sequence of one preceding microinstruction, and $(a)'-(c)'$ are the processing sequence of the next microinstruction, processing is carred out in the sequence of (a)( ), (b, c)(a)', in the two-level control. In contrast, in the three-level pipeline control, if the processing sequence of the next microinstruction is (a)''-(c)'', the processing is executed in the sequence of (a)( )( ), (b)(a)'( ), (c)(b)'(a)''. The present invention can be applied not only to the two-level pipeline control but also to the pipeline control of three or more levels. In the three-level pipeline control, decode of the next microinstruction and fetch of microinstruction next to the former are effected in parallel with the calculation of a given microinstruction. When the microinstruction fetched at present is the branch microinstruction, the NOP microinstruction may be inserted by use of the hardware construction such as the NOP insertion circuits 8-0~8-15 to the output of the microinstruction next to the branch instruction and to the output of the microinstruction next to the former lest two succeeding microinstructions are executed. In the pipeline control of four or more levels, the NOP microinstruction may of course be inserted to the output which is by 3 behind the output next to the branch instruction in the same way as described above.

In accordance with the present invention, it is not necessary to insert the NOP microinstruction for the microprogram of the pipeline control, as described above. Therefore, the present invention is extremely effective particularly for those types of microprocessors which have a limit to the integration density, which contains a large number of branch microinstructions and which are for controlling input/output devices.

It is understood by those skilled in the art that the foregoing description is a preferred embodiment of the system disclosed herein and that various changes and modifications may be made in the invention without departing from the spirit and scope thereof.

What is claimed is:

1. A microprocessor comprising:
   a bus;
   a microprogram ROM coupled to said bus for storing microinstructions and for outputting said microinstructions to said bus, each of said microinstructions including first bit information which represents whether or not each of said microinstructions is a branch instruction, and each branch instruction including second bit information indicating whether said branch instruction is a conditional branch instruction or an unconditional branch instruction;
   an instruction decoder coupled to said bus for decoding a microinstruction received from said bus;
   an arithmetic unit responsive to said instruction decoder for executing a microinstruction and providing an information signal indicating whether or not a branch condition of a conditional branch instruction is satisfied; and
   microinstruction control means coupled to said bus and responsive to said first and second bit information for outputting a microinstruction from said microprogram ROM to said bus in response to a first clock pulse and for transmitting a microinstruction from said bus to said instruction decoder in response to a second clock pulse, and including microinstruction converting means responsive to said first clock pulse and to said information signal from said arithmetic unit for converting a microinstruction outputted to said bus in response to said first clock pulse to a no operation microinstruction when a branch condition of said conditional branch instruction has been satisfied as indicated by said information signal of said arithmetic unit.

2. A microprocessor according to claim 1, wherein said microprocessor is controlled by said first clock pulse and said second clock pulse in a pipeline manner.

3. A microprocessor according to claim 1, wherein said microinstruction converting means includes first means responsive to said second bit information from a branch instruction on said bus and said information signal from said arithmetic unit for producing an output signal indicating detection of an unconditional branch instruction or a conditional branch instruction whose branch condition has been satisfied, and second means connected to said bus and responsive to the output signal of said first means for converting a microinstruction on said bus to a no operation instruction.

4. A microprocess or according to claim 3, wherein said microinstruction control means further includes a program counter connected to said microprogram ROM for applying an address thereto in response to said first clock pulse, an incrementer connected to receive the output of said program counter, and multiplexer means responsive to the output signal of said first means for setting said program counter to an address included in a branch instruction on said bus and for setting said program counter in accordance with an output of said incrementer in the absence of said output signal of said first means.

* * * * *